US010068166B2

(12) United States Patent
Yang

(10) Patent No.: US 10,068,166 B2
(45) Date of Patent: Sep. 4, 2018

(54) BIO-ELECTRONIC TAG-BASED FEATURE EXTRACTION AND VERIFICATION METHOD, DEVICE, TAG AND STORAGE MEDIUM

(71) Applicant: ZTE CORPORATION, Guangdong (CN)

(72) Inventor: Xiangling Yang, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 0 days.

(21) Appl. No.: 15/526,385

(22) PCT Filed: Feb. 9, 2015

(86) PCT No.: PCT/CN2015/072582
§ 371 (c)(1),
(2) Date: May 12, 2017

(87) PCT Pub. No.: WO2015/184851
PCT Pub. Date: Dec. 10, 2015

(65) Prior Publication Data
US 2017/0351944 A1 Dec. 7, 2017

(30) Foreign Application Priority Data
Nov. 13, 2014 (CN) .......................... 2014 1 0642217

(51) Int. Cl.
*G06K 7/10* (2006.01)
*G06K 19/07* (2006.01)
*G06K 19/077* (2006.01)

(52) U.S. Cl.
CPC ..... *G06K 19/0718* (2013.01); *G06K 7/10316* (2013.01); *G06K 7/10366* (2013.01); *G06K 19/07722* (2013.01)

(58) Field of Classification Search
None
See application file for complete search history.

(56) References Cited

U.S. PATENT DOCUMENTS

| 6,024,287 A * | 2/2000 | Takai | G06Q 20/341 |
| | | | 235/493 |
| 8,875,996 B2 * | 11/2014 | Mestres | G06K 19/07354 |
| | | | 235/380 |

(Continued)

FOREIGN PATENT DOCUMENTS

| CN | 101655897 A | 2/2010 |
| CN | 201867862 U | 6/2011 |

(Continued)

OTHER PUBLICATIONS

International Search Report dated Jul. 30, 2015 issued in PCT/CN2015/072582.

(Continued)

*Primary Examiner* — Christle I Marshall
(74) *Attorney, Agent, or Firm* — Scully, Scott, Murphy & Presser, P.C.

(57) ABSTRACT

A bio-electronic tag-based feature extraction and verification method, a device therefor and a tag. The fingerprint electronic tag includes: a resilient film substrate; an antenna formed by a conductive layer attached to the film substrate, the antenna comprising a fingerprint region which forms a microstrip antenna with a printed fingerprint pattern when the fingerprint electronic tag is attached to a finger; and a protective film covering the antenna and bonded to the film substrate.

20 Claims, 8 Drawing Sheets

(56) References Cited

U.S. PATENT DOCUMENTS

| | | | |
|---|---|---|---|
| 2006/0274920 A1 | 12/2006 | Tochikubo et al. | |
| 2008/0028230 A1* | 1/2008 | Shatford | H04L 9/3231 |
| | | | 713/186 |
| 2009/0096574 A1 | 4/2009 | Oberle | |
| 2009/0201128 A1* | 8/2009 | Campisi | G06K 9/00006 |
| | | | 340/5.53 |
| 2017/0323125 A1* | 11/2017 | Yang | G06K 7/10366 |

FOREIGN PATENT DOCUMENTS

| | | |
|---|---|---|
| CN | 102479512 A | 5/2012 |
| CN | 202948464 U | 5/2013 |
| EP | 2 851 775 A1 | 3/2015 |
| WO | 2014/015798 A1 | 1/2014 |

OTHER PUBLICATIONS

Extended Supplementary European Search Report dated Oct. 5, 2017 received in European Patent Application No. 15 80 3503.0.

* cited by examiner

BIO-ELECTRONIC TAG-BASED FEATURE EXTRACTION AND VERIFICATION METHOD, DEVICE, TAG AND STORAGE MEDIUM

CROSS-REFERENCE TO RELATED APPLICATION

This application is the 371 application of PCT Application No. PCT/CN2015/072582, filed Feb. 9, 2015, which is based upon and claims priority to Chinese Patent Application No. 201410642217.2, filed Nov. 13, 2014, the entire contents of which are incorporated herein by reference.

TECHNICAL FIELD

The present disclosure generally relates to an electronic tag and its application, and more particularly, to a method for extracting and verifying a feature based on a bio-electronic tag, and a device and a tag thereof.

BACKGROUND

RFID is an abbreviation of Radio Frequency Identification, i.e., radio frequency identification technology, which is commonly known as an electronic tag. RFID radio frequency identification is a non-contact automatic identification technology which can automatically identify a target object and obtain relevant data through RF signals, without human intervention. RFID is capable of operating in a variety of harsh environments. RFID technology can identify high-speed moving objects and can identify multiple tags at one time, and the operation is quick and easy. Near Field Communication (NFC), also known as short-range wireless communication, is a short-range high-frequency wireless communication technology that allows non-contact point-to-point data transmission between electronic devices. This technology is evolved from contactless radio frequency identification (RFID).

Upon an electronic tag enters a radio frequency electromagnetic field generated by an electronic tag reader, the electronic tag may passively or actively send a signal of a certain frequency. After the electronic tag reader reads and decodes the information, the information is sent to a central information system for data processing. In some cases, the electronic tag reader may write information into the electronic tag.

There are two communication and energy sensing manners between the electronic tag reader and the electronic tag: Inductive Coupling and Backscatter Coupling. With the induction coupling, upon the tag enters the radio frequency electromagnetic field, the tag receives the RF signal transmitted by the reader, and sends out product information stored in the chip by means of energy obtained from induced current. With the backscatter coupling, the electromagnetic waves transmitted based on a radar principle model reflect when encountering a target and carry with information of the target, which is based on the spatial propagation law of electromagnetic waves.

At present, there is an electronic signature system that validates a user's legal identity through an electronic tag. However, there are many security vulnerabilities in the existing electronic signature system. Electronic codes of the electronic tag may be easily imitated or intercepted, resulting in plenty of illegal user accesses.

There are patents which propose fingerprint authentication to improve security. However, with the existing fingerprint authentication, the fingerprint may also be easily imitated or illegally acquired.

In addition, there is also an identity authentication method by authenticating handwriting. However, currently, handwritings are all flat and may also be easily imitated. Also, it cannot achieve collection of space handwriting yet.

This section provides background information related to the present disclosure which is not necessarily prior art.

SUMMARY

Embodiments of the present disclosure provide a novel bio-electronic tag based feature extraction and verification method and a corresponding electronic device, to improve the security of the biological feature information and the reliability of the verification.

Embodiments of the present disclosure also provide a fingerprint electronic tag used for the above feature extraction and verification method.

In order to solve the above technical problem, the embodiments of the present disclosure provide a fingerprint electronic tag, including:
a resilient film substrate (thin film substrate);
an antenna formed by a conductive layer attached to the film substrate, the antenna including a fingerprint region which forms a microstrip antenna with a printed fingerprint pattern when the fingerprint electronic tag is attached (affixed) to a finger; and
a protective film covering the antenna and bonded to the film substrate.

Optionally, the antenna is an annular antenna, and the annular antenna is partially deformed to form the fingerprint region.

Optionally, the bio-electronic tag further includes a chip encapsulated between the film substrate and the protective film and electrically connected to the antenna.

Optionally, the film substrate is a self-adhesive film substrate, one surface of the film substrate which is not attached to the conductive layer has viscosity, and the fingerprint region is located in the middle of the film substrate.

In order to solve the above technical problem, the embodiments of the present disclosure also provide a method for extracting a biological feature based on a bio-electronic tag, including:
turning on, by an electronic device, an electronic tag reader function, and transmitting a radio frequency signal;
performing, by the electronic device, the following test on the bio-electronic tag within a radio frequency electromagnetic field based on each of a plurality of set frequencies:
transmitting a radio frequency signal at each of the frequencies, successively changing a transmission power of the radio frequency signal, and determining a minimum transmission power with which a response of the bio-electronic tag can be detected, to obtain a frequency-power value pair; wherein the bio-electronic tag is an electronic tag formed with real-time participation of a user's body; and
combining all the frequency-power values obtained by the test into a frequency-minimum response power sequence specific to the user, and storing it as biological information of the user by the electronic device.

Optionally, the method also includes: reading identification information of the bio-electronic tag, and saving the identification information and the frequency-minimum response power sequence specific to the user in a corresponding manner by the electronic device.

Optionally, the bio-electronic tag is formed by attaching the above described fingerprint electronic tag on a finger of the user; or the bio-electronic tag is formed by a closed loop constituted by the user's finger as an antenna and the user's body; or the bio-electronic tag is formed by a closed loop constituted by the user's body and the user's finger which is painted with antenna material and taken as an antenna.

In order to solve the above technical problem, the embodiments of the present disclosure also provide an electronic device, including a system for extracting a biological feature based on a bio-electronic tag, wherein the system includes:

an electronic tag reader module configured to, when being turned on, perform the following test on the bio-electronic tag within a radio frequency electromagnetic field based on each of a plurality of set frequencies: transmitting a radio frequency signal at each of the frequencies, successively changing a transmission power of the radio frequency signal, and determining a minimum transmission power with which a response of the bio-electronic tag can be detected, to obtain a frequency-power value pair; wherein the bio-electronic tag is an electronic tag formed with real-time participation of a user's body; and a feature extraction control module configured to configure the frequency and power, control the electronic tag reader module to complete the test, combine all the frequency-power values obtained by the test into a frequency-minimum response power sequence specific to the user, and store it as biological information of the user.

Optionally, the electronic tag reader module is further configured to read identification information of the bio-electronic tag; and the feature extraction control module is configured to, when saving the frequency-minimum response power sequence specific to the user, save the identification information corresponding to the frequency-minimum response power sequence specific to the user.

In order to solve the above technical problem, the embodiments of the present disclosure also provide a method for verifying an identity based on a bio-electronic tag, including:

turning on, by an electronic device, an electronic tag reader function;

transmitting a radio frequency signal periodically and detecting a response of a bio-electronic tag by the electronic device, the bio-electronic tag being an electronic tag formed with real-time participation of a body of a user to be verified; wherein, one period includes a plurality of time slices; in each time slice, a frequency-power value pair in a frequency-minimum response power sequence specific for an expected user is used to set a frequency and a transmission power of the radio frequency signal; and all the frequency-power values in the frequency-minimum response power sequence are used in one period; and determining, by the electronic device, whether a response of the bio-electronic tag is continuously detected during a verification process of at least one period; if yes, determining that the verification is passed, that is, determining that the user to be verified is the expected user.

Optionally, before transmitting the radio frequency signal by the electronic device periodically, the method further includes: reading identification information of the bio-electronic tag, retrieving a corresponding frequency-minimum response power sequence specific to the user according to the identification information, and taking the retrieved frequency-minimum response power sequence as the frequency-minimum response power sequence specific to the expected user.

Optionally, the bio-electronic tag is formed by attaching the above described fingerprint electronic tag on a finger of the user; or the bio-electronic tag is formed by a closed loop constituted by the user's finger as an antenna and the user's body; or the bio-electronic tag is formed by a closed loop constituted by the user's body and the user's finger which is painted with antenna material and taken as an antenna.

In order to solve the above technical problem, the embodiments of the present disclosure also provide an electronic device, including a system for verifying an identity based on a bio-electronic tag, wherein the system includes:

an electronic tag reader module configured to, when being turned on, transmit a radio frequency signal periodically and detect a response of the bio-electronic tag; the bio-electronic tag being an electronic tag formed with real-time participation of a body of a user to be verified; wherein, one period includes a plurality of time slices; in each time slice, a frequency-power value pair in a frequency-minimum response power sequence specific to an expected user is used to configure a frequency and a transmission power of the radio frequency signal; and all the frequency-power values in the frequency-minimum response power sequence specific to the expected user are used in one period; and a verification determining module configured to determine whether a response of the bio-electronic tag is continuously detected during a verification process of at least one period; and if the response of the bio-electronic tag is continuously detected, determine that the verification is passed, that is, determine that the user to be verified is the expected user.

Optionally, the electronic tag reader module is further configured to, before transmitting the radio frequency signal periodically, read identification information of the bio-electronic tag and retrieve a corresponding frequency-minimum response power sequence specific to the user according to the identification information, and take the retrieved frequency-minimum response power sequence as the frequency-minimum response power sequence specific to the expected user.

The embodiments of the present disclosure also provide a computer program and a storage medium thereof, the computer program including computer executable instructions that, when being executed by an electronic device, cause the device to perform the above described bio-electronic tag based biological feature extraction method. The storage medium stores the computer program.

The embodiments of the present disclosure also provide a computer program and a storage medium thereof, the computer program including computer executable instructions that, when being executed by an electronic device, cause the device to perform the above described method for verifying the identity based on the bio-electronic tag. The storage medium stores the computer program.

The bio-electronic tag based feature extraction and verification method and a corresponding electronic device combine the biological feature and the tag technology, to form a bio-electronic tag carrying the biological feature information of the user, and obtain through extraction a unique corresponding frequency-minimum response power sequence based on the physical characteristics of the bio-electronic tag, and save the sequence. The bio-electronic tag is formed when being used, and disappears after being used.

Therefore, there is no need to directly store the biological feature such as the finger in a form of an image and the like, to avoid being imitated or acquired illegally. Verification is performed on a bio-electronic tag formed by real-time participation of the user, not, or not merely verifying electronic codes saved in the tag. Thus, it can improve the reliability of identity verification.

This section provides a summary of various implementations or examples of the technology described in the disclosure, and is not a comprehensive disclosure of the full scope or all features of the disclosed technology.

DETAILED DESCRIPTION

Hereinafter, embodiments of the present disclosure will be described in detail with reference to the accompanying drawings. It is to be noted that the embodiments and the features of embodiments in the present disclosure may be combined with each other without conflict.

First Embodiment

Film electronic tags have been well known, however, there is not a bio-electronic tag produced with real-time participation of a user. The fingerprint electronic tag of the present embodiment can form a bio-electronic tag by being affixed to a finger, and the uniqueness of the physical characteristics of the bio-electronic tag is achieved by the uniqueness of the user's fingerprint.

Figure 1:
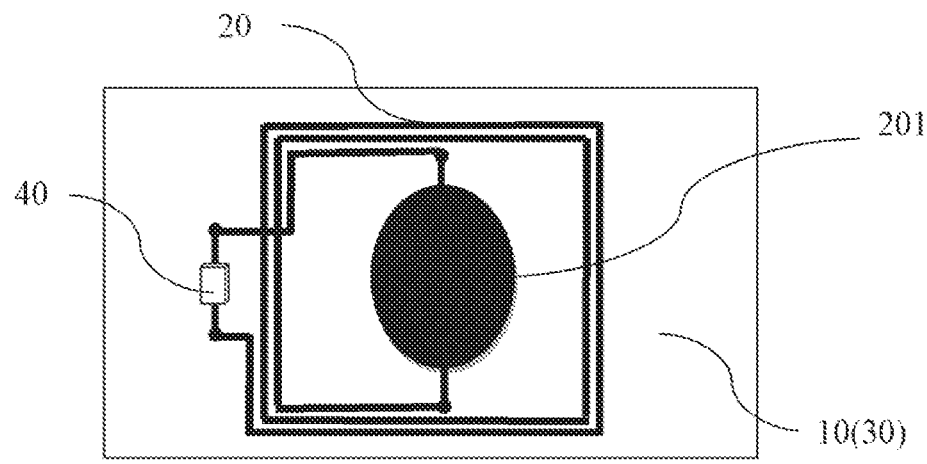
FIG. 1 is a schematic diagram of a structure of a fingerprint electronic tag according to a first embodiment of the present disclosure.

The fingerprint electronic tag of the present embodiment is shown in FIG. 1, and includes:

a resilient film substrate 10;

an antenna 20 formed by a conductive layer attached to the film substrate 10, the antenna including a fingerprint region 201 which forms a microstrip antenna with a printed fingerprint pattern when the fingerprint electronic tag is affixed to a finger;

a protective film 30 covering the antenna and bonded to the film substrate; and a chip 40 encapsulated between the film substrate and the protective film and electrically connected to the antenna.

Since the film substrate 10 and the protective film 30 are of the same size and are bonded together, both of the film substrate 10 and the protective film 30 are present at a position indicated by "10 (30)" in the figures. The film substrate 10 may be a polyvinyl chloride (PVC) film. In order to facilitate the affixing of the above-mentioned tag to the finger, in an embodiment, the film substrate 10 is a self-adhesive film substrate, with a surface which is not attached to the conductive layer having viscosity. However, the present disclosure is not limited to this, and it is also possible to realize the fixing of the tag and the finger by means of other articles, such as a tape, when wearing the tag.

As shown in the figure, the antenna 20 of the present embodiment is generally an annular antenna, but is partially deformed into a fingerprint region 201 which is formed as a microstrip antenna. The resonant frequency of the microstrip antenna may be easily adjusted by slotting at an appropriate position. Slotting may change a previous surface current path of the microstrip antenna, and the current moves in zigzag along an edge of the slot. Then, an effective path becomes longer, which is equivalent to increase a length of a coil. It is found with theoretical and practical verification, that a resonant frequency adjustment range of the slotted tunable film substrate printed microstrip antenna can be more than 50%. In an embodiment, the fingerprint region 201 is located in the middle of the film substrate. Although the fingerprint region 201 is shown as elliptical in the figure, it may also have circular, rectangular or other various regular or irregular shapes, as long as the fingerprint can be printed easily. The antenna 20 may be attached to the film substrate 10 by way of printing using nano silver paste. However, the present disclosure is not limited to this, and the antenna 20 may be attached to the film substrate 10 by other processes, and using other materials such as silver, copper, graphite, graphene or ultrasonic melting materials.

When the chip 40 is electrically connected to the antenna 20, both poles of the chip 40 may be interconnected with poles of the antenna using flip chip technology. The chip 40 is mounted on one side of the film substrate 10. The chip 40 may previously store a flag such as a serial number (which may be any symbol), and the serial number may identify a particular fingerprint electronic tag. The chip 40 may also adopt a chip with processing capability and/or large capacity data storage capability to perform more complex functions. For the fingerprint electronic tag of the embodiments of the present disclosure, the chip 40 is optional and, without the chip 40, the antenna 20 may be designed as a closed structure to form a closed loop, or when the tag is worn on the finger, the antenna 20 forms a closed loop with the human body.

The material for the protective film of the film electronic tag package may be various, from a self-adhesive sticker, paper, nonwoven fabric to plastic. In the present embodiment, a PVC film is utilized. A layer of PVC film is covered on a PVC self-adhesive film which acts as the substrate. The layer of PVC film and the PVC self-adhesive film are bonded together by cold gluing, then is die-cut into diaphragms. The size of a diaphragm is designed as desired, for example 25 mm×40 mm~30 mm×50 mm.

Figure 2:
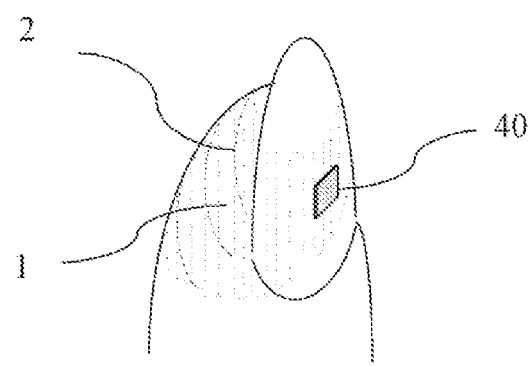
FIG. 2 is a schematic diagram of the fingerprint electronic tag shown in FIG. 1 when being worn on a finger.

FIG. 2 is a schematic diagram when the fingerprint electronic tag 1 is worn on a finger. As shown in the figure, the fingerprint electronic tag 1 has a fingerprint region 201. When wearing the fingerprint electronic tag, the fingerprint region 201 is affixed to a fingerprint portion of the finger pulp, and then other parts of the fingerprint electronic tag is naturally affixed to the finger. The chip 40 is placed on the nail, playing a certain role of supporting and protection.

Figure 3:
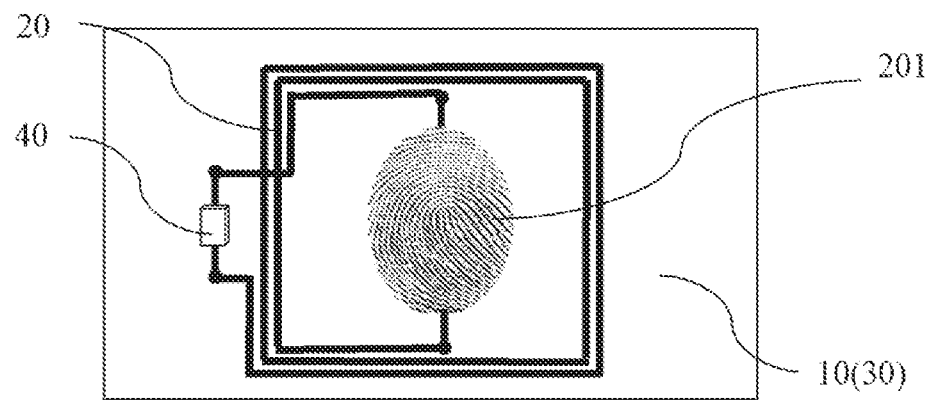
FIG. 3 is a schematic diagram of printing a fingerprint on the fingerprint region of the fingerprint electronic tag shown in FIG. 1.

At this time, since the fingerprint region 201 is in close contact with the fingerprint portion, as shown in FIG. 3, a pattern of the fingerprint 2 is embossed in the fingerprint region 201 (similar to a printed antenna pattern), which is equivalent to slotting on the microstrip antenna, resulting in changing the physical characteristics of the original antenna. That is, the fingerprint pattern printed on the fingerprint region 201 causes the fingerprint region 201 to be formed as a microstrip antenna with a fingerprint slotting characteristic. Moreover, since the fingerprint changes frequently, compared with simply changing the length of the coil, it can increase the change magnitude of the frequencies of different tags. Due to the uniqueness of the user's fingerprint, a bio-electronic tag (which means an electronic tag formed with the participation of the user's body in real time) with unique frequency characteristics, which can uniquely represent the user, may be obtained. The bio-electronic tag will generate a unique feedback signal with respect to the excitation of the radio frequency field of the electronic tag reader, and the electronic tag reader may recognize the unique tag.

When the finger leaves the fingerprint electronic tag, the material of the fingerprint electronic tag returns to the original state since it is resilient. Then, the fingerprint in the fingerprint region disappears. Thus, it can ensure that the fingerprint cannot be illegally stolen. Even if a flat fingerprint pattern of a user is stolen, it is impossible for others to generate the bio-electronic tag of the present embodiment. Therefore, the bio-electronic tag is difficult to be imitated by someone other than the user himself.

Second Embodiment

The bio-electronic tags or other forms of bio-electronic tags formed according to the first embodiment have physiological characteristics corresponding to the user's biological features, such as fingerprints. Such physical characteristics may be extracted and preserved in some way and used for verification of bio-electronic tags.

Figure 4:
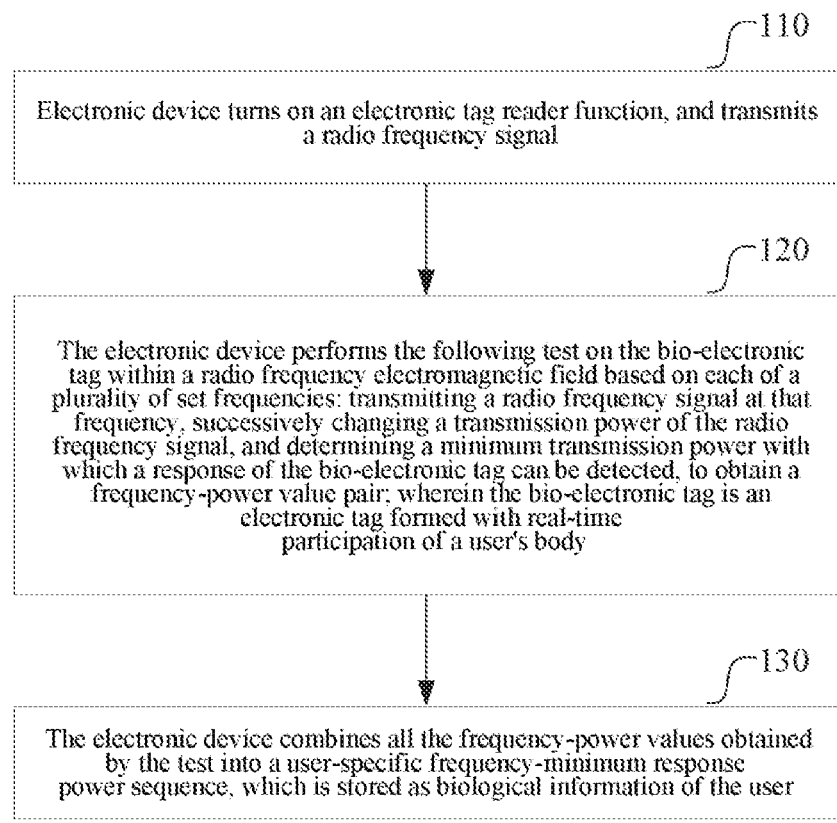
FIG. 4 is a flowchart of a method according to a second embodiment of the present disclosure.

The present embodiment relates to a bio-electronic tag-based biological feature extraction method, and a corresponding electronic device. As shown in FIG. 4, the method includes the following steps.

In step 110, an electronic device turns on an electronic tag reader function, and transmits a radio frequency signal.

It should be noted that the electronic device in the present disclosure (including the present embodiment and other embodiments) may include one physical apparatus or may include a plurality of physical apparatuses connected in a wired manner or a wireless manner for performing biological extraction. A typical application of the electronic device is a smart phone. However, the present disclosure is not limited thereto, and the electronic device may be any electronic device having an electronic tag (e.g., an RFID tag or NFC tag) reader function and a logic processing capability, such as an IPAD, a PDA, a PC, etc., or may be constituted by an electronic tag reader and another apparatus connected to the electronic tag reader, which has a logic processing capability. The electronic tag reader may also be called as a reader apparatus, a scanner, a reader, a communicator, a reader-writer (depending on whether the electronic tag can rewrite the data wirelessly), including a processor, a program memory and a data storage.

In step 120, the electronic device performs the following test on the bio-electronic tag within a radio frequency electromagnetic field based on each of a plurality of set frequencies: transmitting a radio frequency signal at that frequency, successively changing the transmission power of the radio frequency signal, and determining a minimum transmission power with which a response of the bio-electronic tag can be detected, to obtain a frequency-power value pair; wherein the bio-electronic tag is an electronic tag formed with real-time participation of a user's body.

Taking the bio-electronic tag formed by the fingerprint electronic tag in the first embodiment as an example, the user wears the fingerprint electronic tag on the finger to form a bio-electronic tag, and the user places the finger within an operation range of the electronic tag reader (for example, a NFC reader-writer). The NFC reader-writer sends a signal to the tag with a low power and at a set frequency, and the transmission power is gradually increased until a response is detected from the tag (i.e., it is detected that an electronic tag exists in the radio frequency field). At this time, the power is the minimum response power at that frequency. Alternatively, at the set frequency, a signal is sent to the tag with a high power, and the transmission power is gradually decreased until no response is detected from the tag. Then, the power with which the last response is detected is the minimum response power at that frequency. The above test is performed successively with respect to each of the plurality of set frequencies, to obtain the minimum response power corresponding to each frequency, and the minimum response power corresponding to each frequency is recorded as a frequency-power value pair. The number of the set frequencies should ensure that the resulted sequence uniquely corresponds to the fingerprint, and may be selected based on experience, test results, statistical data, etc.

In step 130, the electronic device combines all the frequency-power values obtained by the test into a user-specific frequency-minimum response power sequence, and stores it as biological information of the user.

The above resulted user-specific frequency-minimum response power sequence corresponds to the user's fingerprint, which may also be known as an electronic fingerprint of the user, and can uniquely identify a bio-electronic tag formed by one fingerprint. Different bio-electronic tags have different minimum response powers for the plurality of frequencies. Therefore, a user electronic fingerprint database may be established, which is a list of a series of specific frequencies and their minimum response power, for example:

Fingerprint 1: (13.28, 2.5); (13.00, 4); . . . ; (12.72, 8).
Fingerprint 2: (13.28, 4.0); (13.00, 8); . . . ; (12.72, 15).
........................................................
Fingerprint n: (13.28, 8.0); (13.00, 15); . . . ; (12.72, 23).

The user's electronic fingerprint may be stored in a user terminal, and may also be collected and certificated by an authority certification department. The electronic fingerprint may be collected online through a certification website, or the user may go to an appropriate mechanism to perform the certification. The certified electronic fingerprint information is stored in a security database server.

The bio-electronic tag may be formed in real time with fingerprints and veins on the finger, and other biological features. The biological features and the electronic tag may be combined together by pasting, painting, wearing, implanting, etc. The bio-electronic tag is difficult to be reproduced and forged, and may naturally and directly represent a certain biological body. For example, the bio-electronic tag formed by affixing a fingerprint electronic tag to the user's finger in the first embodiment may be utilized. However, the present disclosure is not limited thereto. For example, the bio-electronic tag may also be formed by a closed loop constituted by the user's finger as an antenna (different fingerprints may also reflect different frequency characteristics in the radio frequency electromagnetic field) and the user's body. Alternatively, antenna material (material having a strong electricity conductive property, such as graphene) may be painted on the user's finger, to function as an antenna to obtain enhanced fingerprint features, and the user's finger and the user's body constitute a closed loop, which forms the bio-electronic tag.

In a multi-user scenario, during the process of storing the user-specific frequency-minimum response power sequence, it is also necessary to correlate the frequency-minimum response power sequence with the bio-electronic tag, to facilitate selecting a corresponding frequency-minimum response power sequence for the subsequent verification of the user. To this end, in the above feature extraction, before the step 120, the method may also include: the electronic reads identification information of the bio-electronic tag (the identification information may be stored in the chip of the bio-electronic tag), and the identification information and the user-specific frequency-minimum response power sequence are saved in a corresponding relationship.

Figure 5:
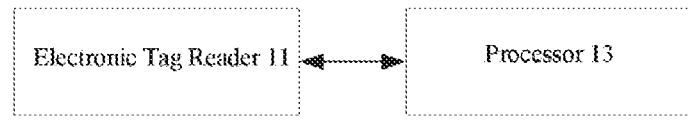
FIG. 5 is a block diagram of an electronic device according to the second embodiment of the present disclosure.

Accordingly, the electronic device of the present embodiment includes a system for extracting a biological feature based on a bio-electronic tag. As shown in FIG. 5, the system includes:

an electronic tag reader module 11 adapted to, when being turned on, perform the following test on the bio-electronic tag within the radio frequency electromagnetic field based on each of a plurality of set frequencies: transmitting a radio frequency signal at that frequency, successively changing a transmission power of the radio frequency signal, and determining a minimum transmission power with which a response of the bio-electronic tag can be detected, to obtain a frequency-power value pair; wherein the bio-electronic tag is an electronic tag formed with real-time participation of a user's body; and a feature extraction control module 13 adapted to configure the frequency and power, control the electronic tag reader module to complete the test, and compose all the frequency-power values obtained by the test into a user-specific frequency-minimum response power sequence, which is stored as biological information of the user.

In an embodiment, the electronic tag reader module is further configured to read identification information of the bio-electronic tag; and the feature extraction control module, when saving the user-specific frequency-minimum response power sequence, saves the identification information corresponding to the frequency-minimum response power sequence.

Third Embodiment

After extraction of the biological feature based on the bio-electronic tag in the second embodiment, the user may be verified using the extracted biological feature information. The present embodiment provides a corresponding bio-electronic tag-based identity verification method and a corresponding electronic device.

Figure 6:
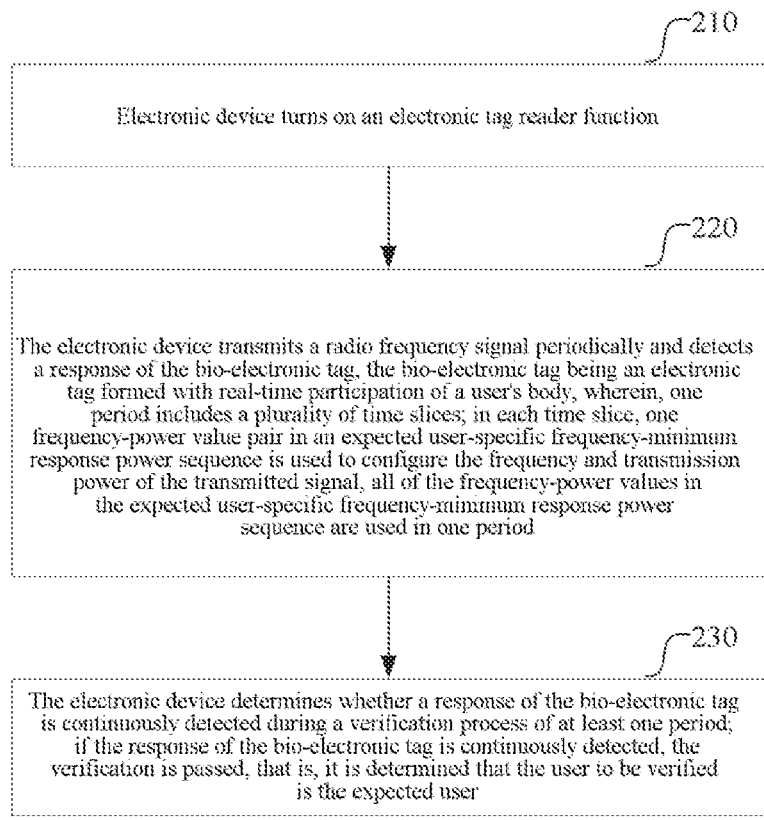
FIG. 6 is a flowchart of a method according to a third embodiment of the present disclosure.

As shown in FIG. 6, the bio-electronic tag-based identity verification method in the present embodiment includes the following steps.

In step 210, an electronic device turns on an electronic tag reader function.

In step 220, the electronic device transmits a radio frequency signal periodically and detects a response from the bio-electronic tag. The bio-electronic tag is an electronic tag formed with real-time participation of a body of a user to be verified. One period includes a plurality of time slices. In each time slice, one frequency-power value pair in an expected user-specific frequency-minimum response power sequence is used to configure the frequency and transmission power of the transmitted signal. All of the frequency-power values in the expected user-specific frequency-minimum response power sequence are used in one period.

The above-described electronic device may be a mobile phone having an NFC function or a dedicated identity verification device having an NFC function. However, the present disclosure is not limited thereto.

Taking the mobile phone as an example, a verification mode for time-sharing switching an operating frequency and power of the electronic tag reader may be turned on in the NFC function (including the electronic tag reader function) of the mobile phone. The expected user-specific frequency-minimum response power sequence may be obtained from a security database server or a native machine, to configure the operating frequency and power of the NFC function in the verification mode. It can be seen from the process of acquiring the user-specific frequency-minimum response power sequence in the second embodiment, only a bio-electronic tag formed with real-time participation of an expected user's body can continuously respond to the transmitted signal with such configured frequencies and powers, that is, responses are always detected in each of the time slices periodically.

In this step, the bio-electronic tag may be formed by affixing the finger electronic tag of the first embodiment to the user's finger. Alternatively, the bio-electronic tag may also be formed by a closed loop constituted by the user's finger as an antenna and the user's body. Alternatively, the bio-electronic tag may also be formed by a closed loop constituted by the user's body and the user's finger which is painted with antenna material and taken as an antenna.

In step 230, the electronic device determines whether a response of the bio-electronic tag is continuously detected during a verification process of at least one period (i.e. whether a response is detected in each time slice periodically). If the response of the bio-electronic tag is continuously detected, the verification is passed, that is, it is determined that the user to be verified is the expected user.

If the response of the bio-electronic tag is continuously detected during a verification process of at least one period, it means that the currently detected bio-electronic tag has the expected user-specific frequency-minimum response power sequence. Since the bio-electronic tag is formed with real-time participation of a user's body, and different users form different bio-electronic tags, if it is verified that the bio-electronic tag is the bio-electronic tag of the expected user, it may be determined that the user to be verified is the expected user.

In order to realize verification of multiple users by one electronic device, before the electronic device transmits a radio frequency signal periodically, the method also includes: reading identification information of the bio-electronic tag and retrieving the corresponding user-specific frequency-minimum response power sequence according to the identification information, and taking the retrieved frequency-minimum response power sequence as the expected user-specific frequency-minimum response power sequence. Specifically, the retrieving may be performed locally at the electronic device, and may also be performed by accessing a server over a network, the server storing user-specific frequency-minimum response power sequences.

Figure 7:
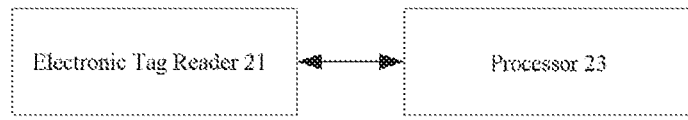
FIG. 7 is a block diagram of an electronic device according to the third embodiment of the present disclosure.

Accordingly, an electronic device of the present embodiment includes a system for identity verification based on a bio-electronic tag. As shown in FIG. 7, the system includes:

an electronic tag reader module 21 adapted to, when being turned on, transmit a radio frequency signal periodically and detect the response of the bio-electronic tag; the bio-electronic tag being an electronic tag formed with real-time participation of a user's body; wherein, one period includes a plurality of time slices; in each time slice, one pair of frequency-power values in an expected user-specific frequency-minimum response power sequence is used to configure the frequency and transmission power of the transmitted signal; and all of the frequency-power values in the expected user-specific frequency-minimum response power sequence are used in one period;

a verification determining module 23 adapted to determine whether the response of the bio-electronic tag is continuously detected during a verification process of at least one period; and if the response of the bio-electronic tag is continuously detected, the verification is passed, that is, it is determined that the user to be verified is the expected user.

In an embodiment, the electronic tag reader module 21 is further configured to, before transmitting a radio frequency signal periodically, read identification information of the bio-electronic tag and retrieve the corresponding user-specific frequency-minimum response power sequence according to the identification information, and taking the retrieved frequency-minimum response power sequence as the expected user-specific frequency-minimum response power sequence.

Fourth Embodiment

Figure 8:
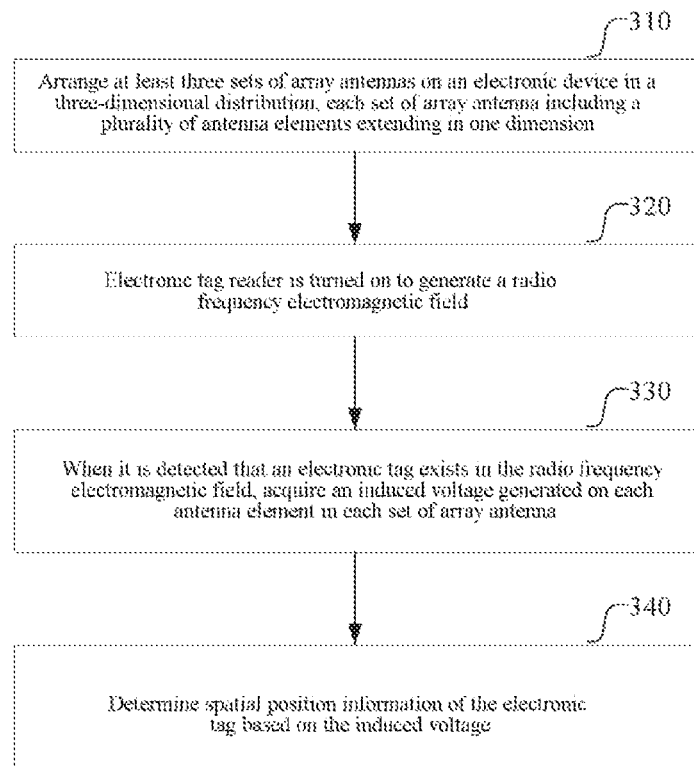
FIG. 8 is a flowchart of a method according to a fourth embodiment of the present disclosure.

The present embodiment relates to a method for spatially positioning an electronic tag and a corresponding electronic device. As shown in FIG. 8, the method includes the following steps.

In step 310, at least three sets of array antennas are arranged on the electronic device in a three-dimensional distribution, each set of array antenna including a plurality of antenna elements extending in one dimension.

The above array antenna may be an NFC or RFID antenna array. In an embodiment, a microstrip antenna is utilized as the antenna element, and the microstrip antenna may, for example, be a rectangular patch or a patch with other shapes.

FIGS. 9A, 9B, 9C and 9D show an example of arranging three sets of array antennas on an electronic device. The electronic device is a mobile phone, for example.

Figure 9A:
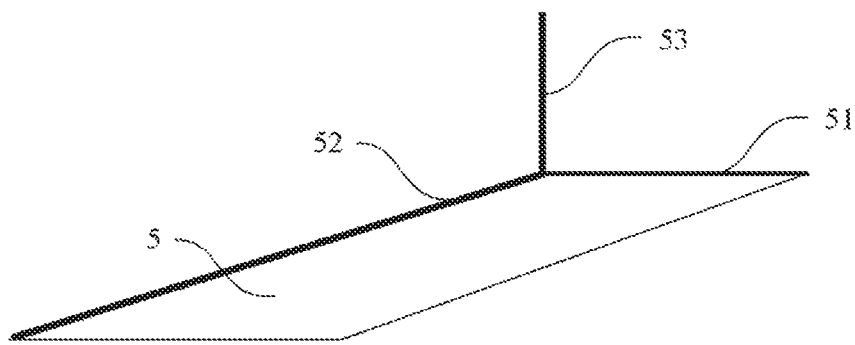
FIG. 9A is a schematic diagram of an arrangement of three sets of array antennas according to a fourth embodiment of the present disclosure.
Figure 9B:
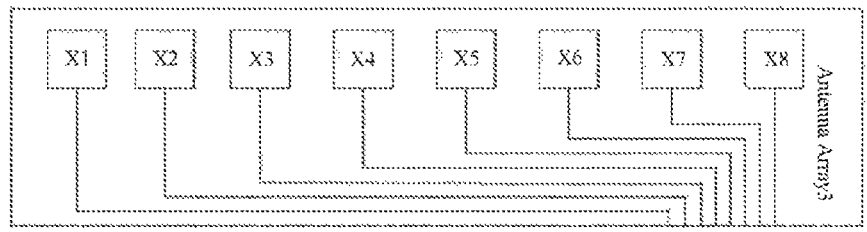
FIGS. 9B to 9D are schematic diagrams of structures of the three sets of array antennas shown in FIG. 9A, respectively.
Figure 9C:
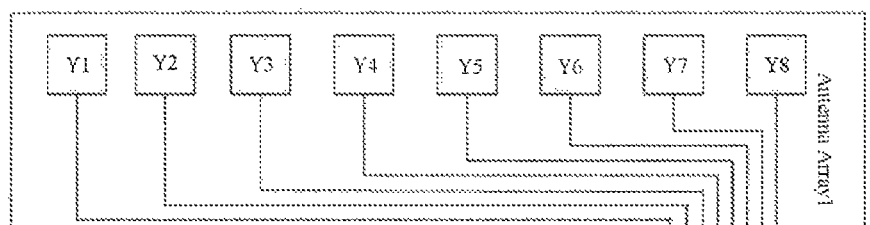
Figure 9D:
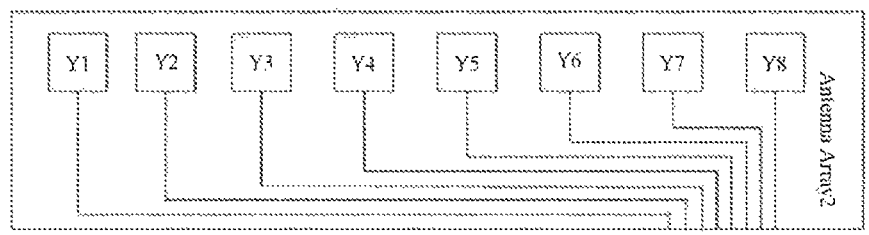

As shown in FIG. 9A, three sets of array antennas, any two of which are perpendicular to each other, are disposed on one surface of the mobile phone 5, such as a lower surface, including a first set of array antenna 51 as shown in FIG. 9B, a second set of array antenna 52 as shown in FIG. 9C and a third set of array antenna 53 as shown in FIG. 9D, to form a Cartesian coordinate system, with the three sets of array antennas corresponding to X, Y, and Z axes, respectively. The first set of array antenna 51 and the second set of array antenna 52 are disposed on adjacent two sides of the same surface of the mobile phone, and the third set of array antenna 53 is disposed at a border of the adjacent two sides, perpendicular to the surface or may be rotated to a position perpendicular to the surface and may be received when not in use.

As shown in FIGS. 9B to 9D, the plurality of antenna elements included in each set of array antenna are a plurality of microstrip antennas uniformly distributed in a straight line to constitute coordinate points of the Cartesian coordinate system. For example, the first set of array antenna 51 includes antenna elements $x1, x2, \ldots, x8$; the second set of array antenna 52 includes antenna elements $y1, y2, \ldots, y8$; and the third set of array antenna 53 includes antenna elements $z1, z2, \ldots, z8$. The number of antenna elements in the figure is only an example, and the number of the antenna elements included in each set of array antenna may be selected according to requirements of positioning accuracy.

In step 320, an electronic tag reader is turned on to generate a radio frequency electromagnetic field.

In step 330, when it is detected that an electronic tag exists in the radio frequency electromagnetic field, an induced voltage generated on each antenna element in each set of array antenna is acquired.

In step 340, spatial position information of the electronic tag is determined based on the induced voltage.

Specifically, three antenna elements which have the largest induced voltages in the three sets of array antennas may be respectively determined; and the identification information or the corresponding coordinate positions of the three antenna elements are taken as the spatial position information. Since when the bio-electronic tag moves in the radio frequency electromagnetic field, an induced electromotive force is obtained, and in turn, the energy is fed back, individual antenna arrays obtain the induced voltage respectively. The electronic device detects a voltage on a feeder line extended from each antenna element of each set of antenna array. In each of the three sets of antennas distributed in the X, Y and Z directions, there is one array element $xn, yn$ or $zn$ having a minimum vertical distance from the tag and receiving the strongest signal transmitted from the tag. Thus, the array element $xn, yn$ or $zn$ represents the coordinate values $xn, yn, zn$ of the fingerprint electronic tag. That is, the spatial coordinates of the current position of the finger may be expressed as $(xn, yn, zn)$. For convenience, the coordinate values may also be replaced by the identification of the antenna elements, such as an index. The index may be converted into a coordinate value when the specific spatial position is to be determined.

Figure 10:
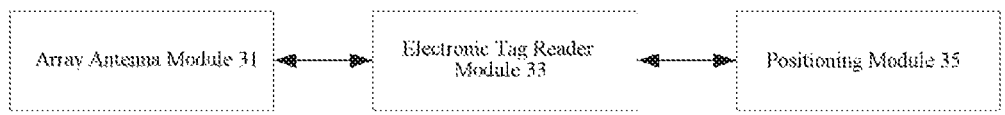
FIG. 10 is a block diagram of an electronic device according to the fourth embodiment of the present disclosure.

Accordingly, the electronic device of the present embodiment includes a system for spatially positioning an electronic tag. As shown in FIG. 10, the system includes:

an array antenna module 31, including at least three sets of array antennas arranged on the electronic device in a three-dimensional distribution, and corresponding electrical circuits, each set of array antenna including a plurality of antenna elements extending in one dimension; the description of the array antenna may refer to the above discussion and FIGS. 9A-9D;

an electronic tag reader module 33, electrically connected to each antenna element in each set of array antenna, and adapted to, when being turned on, generate a radio frequency electromagnetic field, and when it is detected that an electronic tag exists in the radio frequency electromagnetic field, acquire an induced voltage generated on each antenna element in each set of array antenna; and a positioning module 35 adapted to determine spatial position information of the electronic tag based on the induced voltage, for example, to respectively determine three antenna elements which have the largest induced voltages in the three sets of array antennas; and take the identification information or the corresponding coordinate positions of the three antenna elements as the spatial position information.

Fifth Embodiment

Based on the method for spatially positioning the electronic tag according to the fourth embodiment, the existing signature of a user on the paper may be extended to a 3D electronic signature, and the 3D electronic signature may be realized by a terminal such as a mobile phone.

Figure 11:
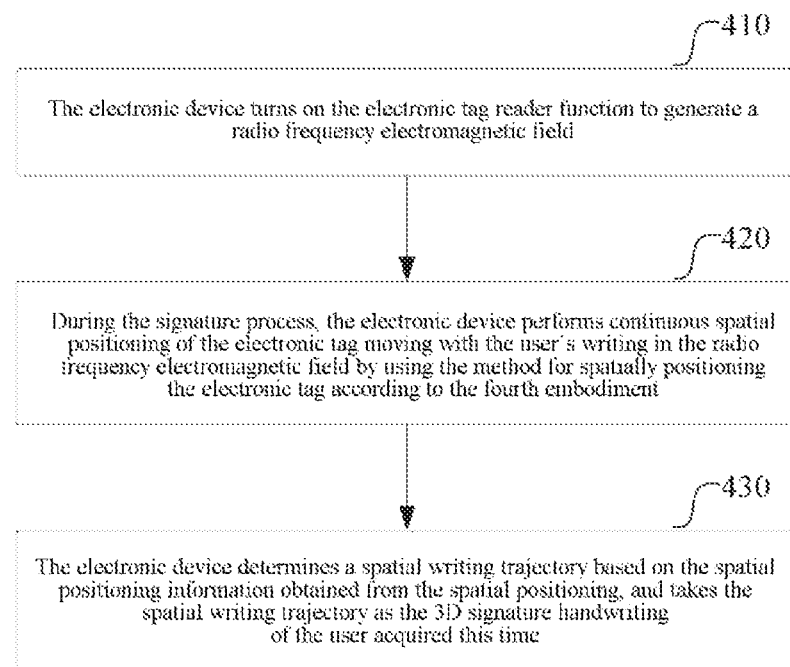
FIG. 11 is a flowchart of a method according to a fifth embodiment of the present disclosure.

The present embodiment relates to a method of 3D electronic signature and a corresponding electronic device. As shown in FIG. 11, the method includes the following steps.

In step 410, the electronic device turns on an electronic tag reader function to generate a radio frequency electromagnetic field.

In step 420, during the signature process, the electronic device performs continuous spatial positioning of the electronic tag moving with the user's writing in the radio frequency electromagnetic field by using the method for spatially positioning the electronic tag according to the fourth embodiment.

In the present embodiment, the electronic tag is located on the finger and/or is formed with participation of the finger. During the signature process, it is not limited that the user is writing a text, the user may even paint a picture.

In step 430, the electronic device determines a spatial writing trajectory based on the spatial positioning information obtained from the spatial positioning, and the spatial writing trajectory is taken as the 3D signature handwriting of the user acquired this time.

In an embodiment, during the signature process, by the electronic tag reader or the processor in the electronic device, time information of the electronic tag moving to each of the positioning points may be recorded at the same time with the spatial positioning. The time information and the spatial position information are combined to form a space-time coordinate (xn, yn, zn, tn). According to the space-time coordinate, it is possible to calculate positions, velocities and directions of the electronic tag/the finger while moving in the radio frequency electromagnetic field. The obtained velocity and direction information may reflect writing habits of the user in detail, and may be used for more accurate handwriting authentication. In addition, the finger shape may be added by means of an infrared sensor and the like, and geographic location or other information may be added by means of GPS or wireless communication base station.

In an application scenario such as financial transaction and document signing, the 3D electronic signature obtained through the above steps 410, 420 and 430 needs to be verified. Therefore, it is necessary to save a certified 3D signature handwriting of the user in advance. Specifically, signature certification locally at the electronic device or at a certification mechanism may be performed through the following two exemplary manners.

First Manner

The electronic tag may be a bio-electronic tag formed with real-time participation of the user.

In an embodiment, the bio-electronic tag is formed by affixing a fingerprint electronic tag to the user's finger in the first embodiment. The fingerprint electronic tag includes: a resilient film substrate; an antenna formed by a conductive layer attached to the film substrate, the antenna including a fingerprint region which forms a microstrip antenna with a printed fingerprint pattern when the fingerprint electronic tag is affixed to a finger; and a protective film covering the antenna and bonded to the film substrate. However, the present disclosure is not limited thereto, and the bio-electronic tag may also be formed by a closed loop constituted by the user's finger as an antenna and the user's body. Alternatively, the bio-electronic tag may also be formed by a closed loop constituted by the user's body and the user's finger which is painted with antenna material and taken as an antenna, and so on.

During the signature process, the electronic device verifies the identity of the user by using the bio-electronic tag-based identity verification method. If the identity verification is passed, the 3D signature handwriting of the user acquired this time is saved as a certified 3D signature handwriting of the user, and otherwise, the 3D signature handwriting acquired this time may be discarded.

The bio-electronic tag-based identity verification method for verifying the user is similar to the method in the third embodiment, including the following steps.

During the signature process, the electronic device transmits a radio frequency signal periodically and detects a response of the bio-electronic tag. One period includes a plurality of time slices. In each time slice, one pair of frequency-power values in an expected user-specific frequency-minimum response power sequence (which may be acquired locally or acquired from an authority certification mechanism over a network) is used to configure the frequency and transmission power of the radio frequency signal. All of the frequency-power values in the expected user-specific frequency-minimum response power sequence are used in one period.

The electronic device determines whether spatial position information of the bio-electronic tag can be detected for each time slice during the signature process. If spatial position information of the bio-electronic tag is detected for each time slice during the signature process, the certification of the fingerprint information in this 3D signature is passed, that is, the identity verification is passed. Otherwise, this signature certification is not passed. If the certification of the fingerprint information in the signature is passed, the 3D signature handwriting of the user acquired this time may be saved as a certified 3D signature handwriting of the user, otherwise the 3D signature handwriting of the user acquired this time is discarded.

Second Manner

During the signature process, the electronic device receives, through the electronic tag, biological feature information of the user acquired in real time by a sensor. After the signature process, the electronic device performs verification on the received biological feature information based on certified biological feature information of the user which was previously stored (that is, performing identity verification on the user). If the verification is passed, the 3D signature handwriting of the user acquired this time is saved as a certified 3D signature handwriting of the user, otherwise the 3D signature handwriting of the user acquired this time may be discarded. The certified biological feature information of the user may be acquired by a corresponding authority mechanism or the user or by other manners. During the process of signature verification, the electronic device may acquire the certified biological feature information of the user from local or from the certification authority mechanism over the network.

The second manner differs from the first manner in that, rather than forming a bio-electronic tag with real-time participation of a human body, in the second manner, the biological feature information of the user is acquired in real time by the sensor. The acquisition of the biological feature may be performed by a RF fingerprint sensor or other fingerprint sensor, or a venous feature recognizer, or a temperature sensor and so on. The biological information acquired by the sensor may be transmitted directly to the electronic device or forwarded to the electronic device via the electronic tag on the finger.

The manner for acquiring the verified 3D signature handwriting of the user is not limited to the above two manners. When it is determined that the operation is made by the user himself or herself (for example, the user has a corresponding permission), the 3D signature handwriting of the user acquired this time may be directly taken as a certified 3D signature handwriting of the user. Nevertheless, the above two manners changes conventional signature certification method, and make certification more convenient and safe. The certified 3D signature handwriting of the user, along with the user-specific frequency-minimum response power sequence, may be saved under a corresponding user name locally in the electronic device or in a security database in a network server of a certification mechanism.

In an application scenario such as financial transaction and document signing, the 3D signature handwriting of the user obtained through the above steps 410, 420 and 430 is the signature to be verified. Specifically, the verification process may be performed through the following three exemplary manners.

First Manner

After a signature is acquired, the electronic device performs comparison and authentication on the 3D signature handwriting of the user acquired this time based on a prestored certified 3D signature handwriting of the user. If the authentication is passed, this signature verification is passed. The comparison and authentication may be performed locally at the electronic device or performed by a network authority certification mechanism or other mechanism upon request. The specific handwriting authentication method is not the content of the present disclosure.

Second Manner

The electronic tag may be a bio-electronic tag formed with real-time participation of the user.

In an embodiment, the bio-electronic tag is formed by affixing a fingerprint electronic tag to the user's finger in the first embodiment. The fingerprint electronic tag includes: a resilient film substrate; an antenna formed by a conductive layer attached to the film substrate, the antenna including a fingerprint region which forms a microstrip antenna with a printed fingerprint pattern when the fingerprint electronic tag is affixed to a finger; and a protective film covering the antenna and bonded to the film substrate. However, the present disclosure is not limited thereto, and the bio-electronic tag may be also be formed by a closed loop constituted by the user's finger as an antenna and the user's body. Alternatively, the bio-electronic tag may also be formed by a closed loop constituted by the user's body and the user's finger which is painted with antenna material and taken as an antenna, and so on.

During the signature process, the electronic device verifies the identity of the user by using the bio-electronic tag-based identity verification method. If the identity verification is passed, the electronic device performs comparison and authentication on the 3D signature handwriting of the user acquired this time based on a certified 3D signature handwriting of the user, which was stored in advance. If the authentication is passed, this signature verification is passed. If the identity verification is not passed or the authentication is not passed, the signature verification is not passed.

The bio-electronic tag-based identity verification method for verifying the identity of the user is similar to the method in the third embodiment, including the following steps.

During the signature process, the electronic device transmits a radio frequency signal periodically and detects the response of the bio-electronic tag. One period includes a plurality of time slices. In each time slice, one pair of frequency-power values in an expected user-specific frequency-minimum response power sequence is used to configure the frequency and transmission power of the transmitted signal. All of the frequency-power values in the expected user-specific frequency-minimum response power sequence are used in one period.

The electronic device determines whether spatial position information of the bio-electronic tag may be detected for each time slice during the signature process. If spatial position information of the bio-electronic tag is detected for each time slice during the signature process, the identity (i.e. the fingerprint information) verification is passed, otherwise this signature verification is not passed at all. If the identity (i.e. the fingerprint information) in the signature is passed, the electronic device further performs comparison and authentication on the 3D signature handwriting acquired at the same time and a certified 3D signature handwriting of the user, which was stored in local or at a network authority certification mechanism in advance, to determine whether the signature verification is passed.

The process of authenticating the user by using the bio-electronic tag-based identity verification method according to the third embodiment is to configure the transmission frequency and power of the electronic tag reader by utilizing the user-specific frequency-minimum response power sequence. That is, throughout the process of the finger signature action, the electronic tag reader maintains the mode of periodically the switching frequency-minimum response power values as described in the third embodiment. If a coordinate position of the finger is detected in each of the time slices during the signature process, it indicates that the identity (fingerprint) verification is passed. Therefore, the identity (fingerprint) verification process and the positioning process of the electronic tag (that is, the obtained signature handwriting) are completely integrated with each other, and they do not need to be verified separately. If the fingerprint verification is not passed, the signature verification is surely not passed; and if an intact signature handwriting can be obtained, it may indicate that the fingerprint is legal, and the signature handwriting may be further authenticated.

Third Manner

During the signature process, the electronic device receives, through the electronic tag, biological feature information of the user acquired in real time by a sensor. After the signature process, the electronic device performs verification on the received biological feature information based on certified biological feature information of the user which was previously stored. If the verification is passed, the electronic device further performs comparison and authentication on the 3D signature handwriting of the user acquired this time based on a certified 3D signature handwriting of the user. If the authentication is passed, this signature verification is passed. The above mentioned biological feature information of the user, which is acquired by the sensor in real time, includes one or more kinds of fingerprint information, finger vein information, and temperature information.

After completion of the above signature, the 3D signature handwriting of the user acquired this time may be stored on a non-transitory entity in a form of an image and/or a video.

Figure 12:
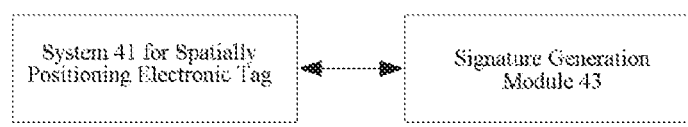
FIG. 12 is a block diagram of an electronic device according to the fifth embodiment of the present disclosure.

Accordingly, the electronic device provided by the present disclosure may realize a 3D electronic signature. As shown in FIG. 12, the electronic device includes:

a system 41 for spatially positioning the electronic tag according to the fourth embodiment, adapted to, during the signature process, perform continuous spatial positioning on the electronic tag moving with the user's writing in the radio frequency electromagnetic field. In an embodiment, the system also records time information of the electronic tag moving to each of the positioning points at the same time with the spatial positioning, to determine positions, velocities and directions of the electronic tag while it is moving in the radio frequency electromagnetic field; and a signature generation module 43 adapted to determine a spatial writing trajectory based on the spatial positioning information obtained from the spatial positioning, and take the spatial writing trajectory as the 3D signature handwriting of the user acquired this time.

Further, the above-mentioned signature may be stored in advance as a certified 3D signature handwriting of the user, and in this case, the electronic device further includes:

a system for verifying an identity based on a bio-electronic tag, adapted to, during the signature process, verify the identity of the user, and if the identity verification is passed, notify a signature storage module; and the signature storage module adapted to, upon receipt of the notification, save the 3D signature handwriting of the user acquired this time as the certified 3D signature handwriting of the user.

Alternatively, the electronic device further includes:

a biological feature verification module adapted to, during the signature process, receive through the electronic tag, biological feature information of the user acquired in real time by a sensor; after the signature process, perform verification on the received biological feature information based on certified biological feature information of the user which was previously stored; and if the verification is passed, notify a signature storage module; and the signature storage module adapted to, upon receipt of the notification, save the 3D signature handwriting of the user acquired this time as a certified 3D signature handwriting of the user.

The above signature may also be verified as a signature to be verified, and in this case, the electronic device further includes:

a signature verification module adapted to, after a signature is acquired, perform comparison and authentication on the 3D signature handwriting of the user acquired this time based on a certified 3D signature handwriting of the user, which was stored in advance; and if the authentication is passed, this signature verification is passed.

Alternatively, the electronic device further includes:

a system for verifying an identity based on a bio-electronic tag, adapted to, during the signature process, verify the identity of the user, and if the identity verification is passed, notify a signature storage module; and the signature verification module adapted to, upon receipt of the notification, perform comparison and authentication on the 3D signature handwriting of the user acquired this time based on a certified 3D signature handwriting of the user, which was stored in advance; and if the authentication is passed, this signature verification is passed.

Alternatively, the electronic device further includes:

a biological feature verification module adapted to, during the signature process, receive, through the electronic tag, biological feature information of the user acquired in real time by a sensor; after the signature process, perform verification on the received biological feature information based on certified biological feature information of the user which was previously stored; and if the verification is passed, notify a signature verification module; and the signature verification module adapted to, upon receipt of the notification, perform comparison and authentication on the 3D signature handwriting of the user acquired this time based on a certified 3D signature handwriting of the user which was stored in advance; and if the authentication is passed, this signature verification is passed.

The system for verifying an identity based on a bio-electronic tag in the above fifth embodiment is similar to the system in the third embodiment, including:

an electronic tag reader module adapted to, after being turned on, during the signature process, transmit a radio frequency signal periodically and detect the response of the bio-electronic tag; wherein, one period includes a plurality of time slices; in each time slice, one pair of frequency-power values in an expected user-specific frequency-minimum response power sequence is used to configure the frequency and transmission power of the transmitted signal; and all of the frequency-power values in the expected user-specific frequency-minimum response power sequence are used in one period; and a verification determining module adapted to determine whether spatial position information of the bio-electronic tag can be detected in each time slice during the signature process; and if spatial position information of the bio-electronic tag is detected in each time slice during the signature process, it indicates that the biological feature (fingerprint) matches, that is, the identity verification is passed. Then, the signature verification module will perform the subsequent process.

Based on the above 3D signature scheme, the user may write in the air with his finger. The spatial writing trajectory (characterized writing habit) and the fingerprint, and even other biological features are combined and digitized, and integrated into the whole writing trajectory to generate a novel 3D handwriting signature. The handwriting is in the air, which increases the number of dimensions, and leaves no trace, so it is difficult to be imitated. The fingerprint is not stored separately from the signature, but is combined with the signature handwriting naturally in real time, so that a higher security may be ensured. Signing is completed at one time and in real time, so it is convenient and natural for the user, and also conforms to traditional habit. It eliminates the need for taking a fingerprint, traditional handwriting a signature and stamping separately. The above method may be used for signing certificates and contract documents, for signature confirmation links in electronic wallets, online payment, mobile phones and computer unlocking, access control and other application scenarios, so that the transaction and information security can be enhanced with most natural and traditional way. The method can also be used for signing a book, celebrity handwriting, and even painting, calligraphy and collection and other applications. In particular, combined with 3D holographic imaging technology, 3D human-machine interface interaction may also be achieved.

Sixth Embodiment

In an electronic device equipped with 3D holographic image technology, the 3D holographic image space may be overlapped with the radio frequency field space generated by the electronic device. Then, using the above method for spatially positioning an electronic tag, 3D human-machine interface interaction may be realized.

Figure 13:
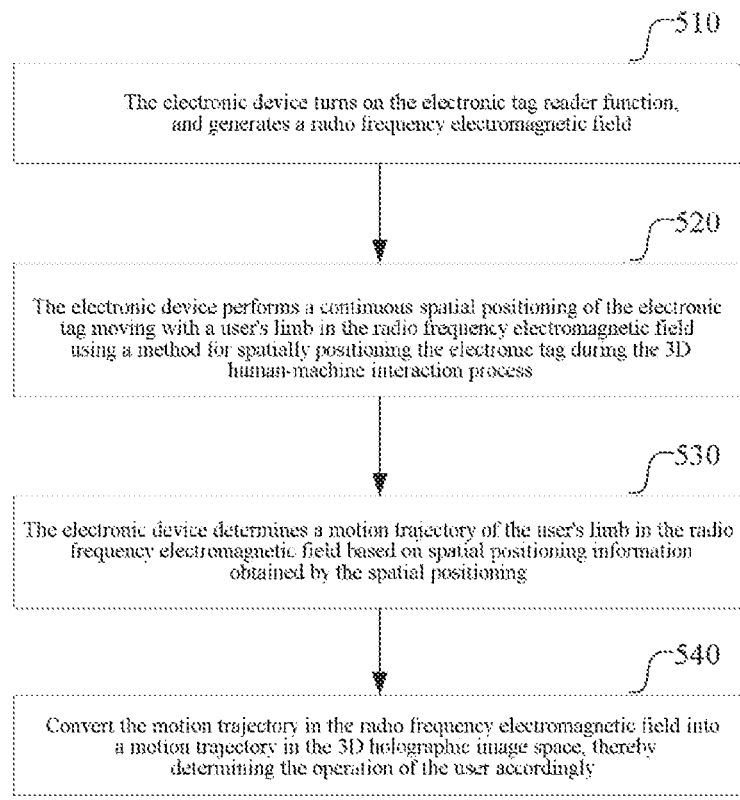
FIG. 13 is a flowchart of a method according to a sixth embodiment of the present disclosure.

The present embodiment relates to a method and an electronic device for 3D human-machine interaction. As shown in FIG. 13, the method includes the following steps.

In step 510, the electronic device turns on an electronic tag reader function, generates a radio frequency electromagnetic field, and at the same time, the electronic device turns on a 3D holographic image spatial display function.

In step 520, the electronic device performs a continuous spatial positioning of the electronic tag moving with a user's limb in the radio frequency electromagnetic field by using a method for spatially positioning the electronic tag during the 3D human-machine interaction process.

The above method for spatially positioning the electronic tag may be performed with the method in the fourth embodiment.

In step 530, the electronic device determines a motion trajectory of the user's limb in the radio frequency electromagnetic field based on spatial positioning information obtained by the spatial positioning.

In step 540, the motion trajectory in the radio frequency electromagnetic field is converted into a motion trajectory in the 3D holographic image space, thereby determining the operation of the user.

In this step, the Cartesian coordinate system composed of three sets of array antennas provided on the electronic device may be used as the three-dimensional spatial coordinate system of the 3D holographic image space, and the motion trajectory of the electronic tag in the Cartesian coordinate system is used as the motion trajectory in the 3D holographic image space.

Figure 14:
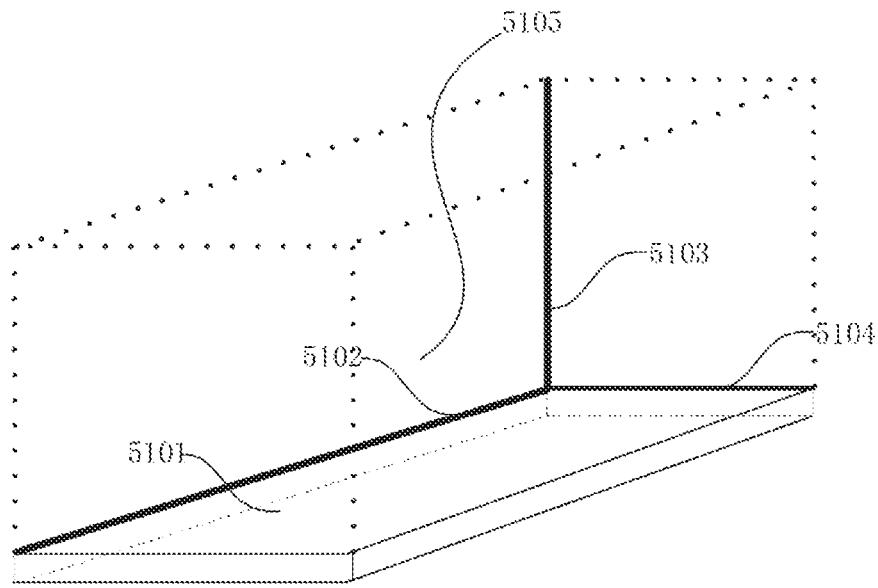
FIG. 14 is a schematic diagram of a relationship between a 3D holographic image space and a Cartesian coordinate system according to the sixth embodiment of the present disclosure.

As shown in FIG. 14, a flat cube of solid lines represents a mobile phone 5101, and three sets of array antennas 5102, 5103, and 5104 are distributed in XYZ directions of one surface of the mobile phone 5101. A cube region 5105 of dotted lines represents a part of a 3D image space naturally overlapping with an electromagnetic field, that is, an effective space for 3D human-machine interaction. In this case, the three-dimensional spatial coordinate system of the 3D holographic image is the three-dimensional Cartesian coordinate system identified by the antenna arrays described in steps 310-340. By calculating whether a coordinate of the position of the finger in the spatial coordinate system fall within the spatial coordinate range of a certain hotspot or a control of the 3D holographic image, it may be determined whether the smart terminal device (such as the mobile phone) should respond to the action of the finger, thus realizing the 3D human-machine interaction.

In the present embodiment, a bio-electronic tag formed with real-time participation of a user's body may be adopted. In this case, the method also includes: during the 3D human-machine interaction process, the electronic device verifies an identity of the user based on the bio-electronic tag based identity verification method. If the identity verification is passed, the operation of the user is accepted. If the identity verification is not passed, the operation of the user is not accepted. When the identity verification is not passed, the user is regarded as an illegal user, and the 3D human-machine interaction process is stopped.

This identity verification method during the 3D interaction process (as well as the 3D signature process in the previous embodiment), combines the identity verification with the user operation, without additional processes. It is very convenient and of high security, and has a high application value.

The above bio-electronic tag-based identity verification method is similar to the method in the third embodiment, including the following steps.

During the 3D human-machine interaction process, the electronic device transmits a radio frequency signal periodically and detects the response of the bio-electronic tag. One period includes a plurality of time slices. In each time slice, one pair of frequency-power values in an expected user-specific frequency-minimum response power sequence is used to configure the frequency and transmission power of the transmitted signal. All of the frequency-power values in the expected user-specific frequency-minimum response power sequence are used in one period.

The electronic device determines whether spatial position information of the bio-electronic tag can be detected in each time slice during the 3D human-machine interaction process. If spatial position information of the bio-electronic tag is detected in each time slice during the 3D human-machine interaction process, the verification is passed; otherwise, the verification is not passed.

In an embodiment, the bio-electronic tag is formed by affixing a fingerprint electronic tag to the user's finger. The fingerprint electronic tag includes: a resilient film substrate; an antenna formed by a conductive layer attached to the film substrate, the antenna including a fingerprint region which forms a microstrip antenna with a printed fingerprint pattern when the fingerprint electronic tag is affixed to a finger; and a protective film covering the antenna and bonded to the film substrate. However, the present disclosure is not limited thereto, and the bio-electronic tag may be also be formed by a closed loop constituted by the user's finger as an antenna and the user's body. Alternatively, the bio-electronic tag may also be formed by a closed loop constituted by the user's body and the user's finger which is painted with antenna material and taken as an antenna, and so on.

Figure 15:
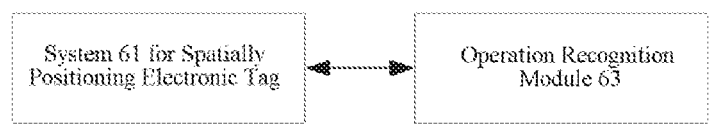
FIG. 15 is a block diagram of an electronic device according to the sixth embodiment of the present disclosure.

Accordingly, the electronic device of the present embodiment is used for 3D human-machine interaction, as shown in FIG. 15, including:

a system 61 for spatially positioning the electronic tag according to the fourth embodiment, adapted to perform a continuous spatial positioning on the electronic tag moving with the user's limb in the radio frequency electromagnetic field during the 3D human-machine interaction process; and an operation recognition module 63 adapted to determine a motion trajectory of the user's limb in the radio frequency electromagnetic field based on spatial positioning information obtained by the spatial positioning, convert the motion trajectory into a motion trajectory in the 3D holographic image space, and recognize the operation of the user accordingly.

When the system for spatially positioning the electronic tag uses three sets of array antennas to form a Cartesian coordinate system, the Cartesian coordinate system formed by the three sets of array antennas arranged on the electronic device may be taken as the three-dimensional spatial coordinate system of the 3D holographic image space, and the motion trajectory of the electronic tag in the Cartesian coordinate system may be taken as the motion trajectory in the 3D holographic image space.

The electronic device of the present embodiment may also include a system for verifying an identity based on a bio-electronic tag, configured to, during the 3D human-machine interaction process, perform an identity verification on the user; if the identity verification is passed, accept the operation of the user; and if the identity verification is not passed, reject the operation of the user.

The system for verifying an identity based on a bio-electronic tag is similar to the system in the third embodiment, including:

an electronic tag reader module adapted to, after being turned on, during the 3D human-machine interaction process, transmit a radio frequency signal periodically and detect a response of the bio-electronic tag; wherein, one period includes a plurality of time slices; in each time slice, one pair of frequency-power values in an expected user-specific frequency-minimum response power sequence is used to configure the frequency and transmission power of the transmitted signal; and all of the frequency-power values in the expected user-specific frequency-minimum response power sequence are used in one period; and a verification determining module adapted to determine whether spatial position information of the bio-electronic tag can be detected in each time slice during the 3D human-machine interaction process; and if spatial position information of the bio-electronic tag is detected in each time slice during the 3D human-machine interaction process, it indicates that the identity verification is passed; otherwise, the identity verification is not passed.

The electronic tag reader module, the feature extraction control module, the electronic tag reader module and the verification determining module in the electronic device proposed in the embodiments of the present disclosure may be implemented by a processor, or may be implemented by a specific logic circuit. The processor may be a processor on a terminal. In actual applications, the processor may be a central processing unit (CPU), a microprocessor (MPU), a digital signal processor (DSP), or a field programmable gate array (FPGA) and so on.

In the embodiments of the present disclosure, if the above method is implemented in the form of a software function module and is sold or used as a stand-alone product, it may be stored in a computer-readable storage medium. Based on this understanding, the technical solution of the embodiments of the present disclosure in essence, or a part thereof which contributes to the prior art, may be embodied in the form of a software product stored in a storage medium including a number of instructions to cause a computer device (which may be a personal computer, a server, or a network device, etc.) to perform all or part of the method described in the various embodiments of the present disclosure. The aforementioned storage medium includes a variety of media such as a USB disk, a mobile hard disk, a read only memory (ROM), a magnetic disk, or an optical disk that may store program codes. Thus, the embodiments of the present disclosure are not limited to any particular combination of hardware and software.

Accordingly, an embodiment of the present disclosure further provides a computer storage medium in which a computer program is stored for executing the above-described method of the embodiments of the present disclosure.

The foregoing is merely preferred embodiments of the present disclosure and are not intended to limit the scope of the present disclosure.

INDUSTRIAL APPLICABILITY

The embodiments of the present disclosure provides a feature extraction and verification method based on a bio-electronic tag, and a device and a tag thereof, in which the fingerprint electronic tag utilizes a resilient film substrate and an antenna formed by a conductive layer attached to the film substrate. By a particular corresponding relationship between a microstrip antenna formed with a printed fingerprint pattern when the fingerprint electronic tag is affixed to a finger and the fingerprint of a human, such fingerprint electronic tag is worn on the finger, and a bio-electronic tag with real-time participation of a human body is formed. It can enhance the security of the biological feature information and the reliability of the verification.

What is claimed is:

1. A fingerprint electronic tag, comprising:
   a resilient film substrate;
   an antenna formed by a conductive layer attached to the film substrate, the antenna comprising a fingerprint region which forms a microstrip antenna with a printed fingerprint pattern when the fingerprint electronic tag is attached to a finger; and
   a protective film covering the antenna and bonded to the film substrate.

2. The fingerprint electronic tag according to claim 1, wherein
   the antenna is an annular antenna, and the annular antenna is partially deformed to form the fingerprint region.

3. The fingerprint electronic tag according to claim 2, wherein
   the fingerprint electronic tag further comprises a chip encapsulated between the film substrate and the protective film and electrically connected to the antenna.

4. The fingerprint electronic tag according to claim 2, wherein
   the film substrate is a self-adhesive film substrate, a surface of the film substrate which is not attached to the conductive layer has viscosity, and the fingerprint region is located in the middle of the film substrate.

5. The fingerprint electronic tag according to claim 1, wherein
   the fingerprint electronic tag further comprises a chip encapsulated between the film substrate and the protective film and electrically connected to the antenna.

6. The fingerprint electronic tag according to claim 1, wherein
   the film substrate is a self-adhesive film substrate, a surface of the film substrate which is not attached to the conductive layer has viscosity, and the fingerprint region is located in the middle of the film substrate.

7. A method for extracting a biological feature based on a bio-electronic tag, comprising:
   turning on, by an electronic device, an electronic tag reader function to transmit a radio frequency signal;
   performing, by the electronic device, the following test on the bio-electronic tag within a radio frequency electromagnetic field based on each of a plurality of set frequencies: transmitting a radio frequency signal at each of the frequencies, successively changing a transmission power of the radio frequency signal, and determining a minimum transmission power with which a response of the bio-electronic tag can be detected, to obtain a frequency-power value pair; wherein the bio-electronic tag is an electronic tag formed with real-time participation of a user's body; and combining all the frequency-power values obtained by the test into a frequency-minimum response power sequence specific to the user, and storing it as biological information of the user by the electronic device.

8. The method according to claim 7, further comprising:
reading identification information of the bio-electronic tag, and saving the identification information and the frequency-minimum response power sequence specific to the user in a corresponding manner by the electronic device.

9. The method according to claim 8, wherein
the bio-electronic tag is formed by attaching a fingerprint electronic tag on a finger of the user wherein said fingerprint electronic tag comprises a resilient film substrate, an antenna formed by a conductive layer attached to the film substrate, the antenna comprising a fingerprint region which forms a microstrip antenna with a printed fingerprint pattern when the fingerprint electronic tag is attached to a finger, and a protective film covering the antenna and bonded to the film substrate; or
the bio-electronic tag is formed by a closed loop constituted by the user's finger as an antenna and the user's body; or
the bio-electronic tag is formed by a closed loop constituted by the user's body and the user's finger which is painted with antenna material and taken as an antenna.

10. The method according to claim 7, wherein
the bio-electronic tag is formed by attaching a fingerprint electronic tag on a finger of the user wherein said fingerprint electronic tag comprises a resilient film substrate, an antenna formed by a conductive layer attached to the film substrate, the antenna comprising a fingerprint region which forms a microstrip antenna with a printed fingerprint pattern when the fingerprint electronic tag is attached to a finger, and a protective film covering the antenna and bonded to the film substrate; or
the bio-electronic tag is formed by a closed loop constituted by the user's finger as an antenna and the user's body; or
the bio-electronic tag is formed by a closed loop constituted by the user's body and the user's finger which is painted with antenna material and taken as an antenna.

11. A computer program storage medium, the computer program storage medium storing computer executable instructions that, when being executed by an electronic device, cause the device to perform the method of claim 7.

12. A method for verifying an identity based on a bio-electronic tag, comprising:
turning on, by an electronic device, an electronic tag reader function;
transmitting a radio frequency signal periodically and detecting a response of a bio-electronic tag by the electronic device, the bio-electronic tag being an electronic tag formed with real-time participation of a body of a user to be verified; wherein, one period includes a plurality of time slices; in each time slice, a frequency-power value pair in a frequency-minimum response power sequence specific for an expected user is used to set a frequency and a transmission power of the radio frequency signal; and all the frequency-power values in the frequency-minimum response power sequence are used in one period; and determining, by the electronic device, whether a response of the bio-electronic tag is continuously detected during a verification process of at least one period; if yes, determing that the verification is passed, that is, determining that the user to be verified is the expected user.

13. The method according to claim 12, wherein
before transmitting the radio frequency signal by the electronic device periodically, the method further comprises: reading identification information of the bio-electronic tag, retrieving a corresponding frequency-minimum response power sequence specific to the user according to the identification information, and taking the retrieved frequency-minimum response power sequence as the frequency-minimum response power sequence specific to the expected user.

14. The method according to claim 13, wherein
the bio-electronic tag is formed by attaching a fingerprint electronic tag on a finger of the user, wherein said fingerprint electronic tag comprises a resilient film substrate, an antenna formed by a conductive layer attached to the film substrate, the antenna comprising a fingerprint region which forms a microstrip antenna with a printed fingerprint pattern when the fingerprint electronic tag is attached to a finger, and a protective film covering the antenna and bonded to the film substrate; or
the bio-electronic tag is formed by a closed loop constituted by the user's finger as an antenna and the user's body; or
the bio-electronic tag is formed by a closed loop constituted by the user's body and the user's finger which is painted with antenna material and taken as an antenna.

15. The method according to claim 12, wherein
the bio-electronic tag is formed by attaching a fingerprint electronic tag on a finger of the user, wherein said fingerprint electronic tag comprises a resilient film substrate, an antenna formed by a conductive layer attached to the film substrate, the antenna comprising a fingerprint region which forms a microstrip antenna with a printed fingerprint pattern when the fingerprint electronic tag is attached to a finger, and a protective film covering the antenna and bonded to the film substrate on a finger of the user; or
the bio-electronic tag is formed by a closed loop constituted by the user's finger as an antenna and the user's body; or
the bio-electronic tag is formed by a closed loop constituted by the user's body and the user's finger which is painted with antenna material and taken as an antenna.

16. A computer program storage medium, the computer program storage medium storing computer executable instructions that, when being executed by an electronic device, cause the device to perform the method of claim 12.

17. An electronic device, comprising a system for extracting a biological feature based on a bio-electronic tag, wherein the system comprises:
an electronic tag reader configured to, when being turned on, perform the following test on the bio-electronic tag within a radio frequency electromagnetic field based on each of a plurality of set frequencies: transmitting a radio frequency signal at each of the frequencies, successively changing a transmission power of the radio frequency signal, and determining a minimum transmission power with which a response of the bio-electronic tag can be detected, to obtain a frequency-power value pair; wherein the bio-electronic tag is an electronic tag formed with real-time participation of a user's body; and a processor configured to configure the frequency and power, control the electronic tag reader to complete the test, combine all the frequency-power values obtained by the test into a frequency-minimum response power sequence specific to the user, and store it as biological information of the user.

18. The electronic device according to claim 17, wherein the electronic tag reader is further configured to read identification information of the bio-electronic tag; and the processor is configured to, when saving the frequency-minimum response power sequence specific to the user, save the identification information corresponding to the frequency-minimum response power sequence specific to the user.

19. An electronic device, comprising: a system for verifying an identity based on a bio-electronic tag, wherein the system comprises:

an electronic tag reader configured to, when being turned on, transmit a radio frequency signal periodically and detect a response of the bio-electronic tag; the bio-electronic tag being an electronic tag formed with real-time participation of a body of a user to be verified; wherein, one period includes a plurality of time slices; in each time slice, a frequency-power value pair in a frequency-minimum response power sequence specific to an expected user is used to configure a frequency and a transmission power of the radio frequency signal; and all the frequency-power values in the frequency-minimum response power sequence specific to the expected user are used in one period; and a processor configured to determine whether a response of the bio-electronic tag is continuously detected during a verification process of at least one period; and if the response of the bio-electronic tag is continuously detected, determine that the verification is passed, that is, determine that the user to be verified is the expected user.

20. The electronic device according to claim 19, wherein the electronic tag reader is further configured to, before transmitting the radio frequency signal periodically, read identification information of the bio-electronic tag and retrieve a corresponding frequency-minimum response power sequence specific to the user according to the identification information, and take the retrieved frequency-minimum response power sequence as the frequency-minimum response power sequence specific to the expected user.

* * * * *